United States Patent
Bucks et al.

[11] Patent Number: 6,118,259
[45] Date of Patent: Sep. 12, 2000

[54] CONTROLLED CURRENT GENERATOR FOR OPERATING LIGHT EMITTING DIODES

[75] Inventors: Marcel J. M. Bucks, Best; Engbert B. G. Nijhof, Eindhoven, both of Netherlands

[73] Assignees: U.S. Philips Corporation, New York, N.Y.; Lumileds Lighting B.V., Netherlands

[21] Appl. No.: 09/300,699

[22] Filed: Apr. 27, 1999

[30] Foreign Application Priority Data

Apr. 29, 1998 [EP] European Pat. Off. ............ 98201391

[51] Int. Cl.⁷ .................................................. G05F 3/08

[52] U.S. Cl. .......................... 323/312; 323/277; 315/287

[58] Field of Search ................................. 323/304, 311, 323/312, 277; 327/108, 109; 315/311, 169.3, 246, 287; 307/117, 131; 361/63, 65; 362/800

[56] References Cited

U.S. PATENT DOCUMENTS

| | | | |
|---|---|---|---|
| 3,784,844 | 1/1974 | McGrogan, Jr. | 327/108 |
| 3,944,854 | 3/1976 | Keller | 307/311 |
| 4,394,603 | 7/1983 | Widmayer | 315/311 |
| 4,528,492 | 7/1985 | Inaniwa et al. | 320/36 |

FOREIGN PATENT DOCUMENTS

| | | |
|---|---|---|
| 0557775A1 | 9/1993 | European Pat. Off. . |
| 2724749A1 | 3/1996 | France . |
| 4202776A1 | 8/1993 | Germany . |

*Primary Examiner*—Jessica Han
*Attorney, Agent, or Firm*—Bernard Franzblau

[57] ABSTRACT

A circuit for operation of a semiconductor light source having terminals for connecting a source of power and output terminals for connecting the semiconductor light source. The circuit is also provided with a controlled current generator and is also concerned with a signal head incorporating the circuit. The controlled current generator is controlled by the current flow through the semiconductor light source and the current supplied by the controlled current generator.

16 Claims, 2 Drawing Sheets

CONTROLLED CURRENT GENERATOR FOR OPERATING LIGHT EMITTING DIODES

BACKGROUND OF THE INVENTION

This invention relates to a circuit arrangement for operating a semiconductor light source, provided with connection terminals for connecting a power supply, output terminals for connecting the semiconductor light source.

The invention also relates to a signalling light provided with such a circuit arrangement.

Semiconductor light sources are increasingly used as signalling lights. In such an application, a semiconductor light source has the advantage over a conventional incandescent lamp in that it has a considerably longer useful life and a considerably lower power consumption than the incandescent lamp. Signalling lights often form part of a complicated signalling system, for example, a traffic control system with traffic lights. It is necessary for the circuit arrangement to provide a retrofit possibility in relation to existing signalling systems if the above advantages of semiconductor light sources are to be realized on a wide scale.

The control of a signalling light in existing signalling systems often takes place by means of a status test of the signalling light. A generally used test is the periodic measurement of the value of the current drawn from the power supply. The use of a semiconductor light source is found to lead to a tendency to obtain an incorrect outcome of the status test. This hampers the use of the semiconductor light source as a signalling light in existing signalling systems.

SUMMARY OF THE INVENTION

It is an object of the invention to provide a measure by which the above drawback is eliminated.

According to the invention, this object is achieved in that the circuit arrangement is in addition provided with a controlled constant current generator. The controlled constant current generator renders it possible to draw a sufficiently great current from the power supply unit when the power supply unit, for example a solid state relay, is in the conductive state. It is realized thereby in a simple and effective manner that the circuit arrangement exhibits a characteristic at its connection terminals which corresponds to a major degree to the characteristic of an incandescent lamp.

An important feature of an incandescent-lamp characteristic in this respect is an essentially linear relation between the applied voltage and the current value. A semiconductor light source by contrast has a threshold voltage below which the semiconductor draws only a very small current and above which the semiconductor exhibits a comparatively steep current-voltage characteristic. When the power supply unit becomes conducting, therefore, a very weak current will initially be drawn from the power supply unit until the moment the voltage has risen to above the threshold voltage level of the semiconductor. Only very little current will flow initially after each zero passage of the current from the power supply unit, especially in the case in which the power supply unit supplies an AC voltage for operating the semiconductor light source, until the moment the voltage has risen to above the threshold voltage level of the semiconductor again. This involves the risk that a status test shortly after a zero passage of the supply voltage, for example in the case of operation on a sinusoidal AC voltage, will register a current drawn from the power supply unit which is insufficient for a correct functioning of the signalling light in question. This risk is counteracted by means of the measure according to the invention.

Preferably, the controlled constant current generator according to the invention is self-controlling, which has the advantage that it counteracts an excessive current flow from the power supply unit and also limits any unnecessary power dissipation. In a further preferred embodiment of the circuit arrangement according to the invention, said circuit arrangement is provided with a current sensor for generating a control signal for controlling the controlled constant current generator, said control signal being dependent both on the value of the current through the semiconductor light source and on the value of the current supplied by the controlled constant current generator. It is rendered possible thereby in a very simple manner to adapt the current supplied by the controlled constant current generator to the value of the current passing through the semiconductor light source. In an advantageous embodiment of the circuit arrangement according to the invention, the circuit arrangement is provided with a current fuse. This embodiment has the major advantage that the circuit arrangement is irrevocably deactivated if an excessive current should flow through the circuit arrangement. The occurrence of an excessive current value may point to an incorrect functioning of a signalling system of which the signalling light forms part. An incorrectly functioning system is a situation which is to be prevented at all times where signalling lights are used.

Preferably, a signalling light provided with a housing containing a semiconductor light source according to the invention is also provided with the circuit arrangement according to the invention. The possibilities of using the signalling light as a retrofit unit for an existing signalling light are strongly enhanced thereby. The application possibilities as a retrofit signalling light are optimized when the circuit arrangement is provided with a housing which is integral with the housing of the signalling light.

BRIEF DESCRIPTION OF THE DRAWINGS

The above and further aspects of the invention will now be explained in more detail with reference to a drawing of an embodiment of the circuit arrangement according to the invention, in which FIG. 1 diagrammatically shows a circuit arrangement according to the invention.

DESCRIPTION OF THE PREFERRED EMBODIMENTS

Figure 1:
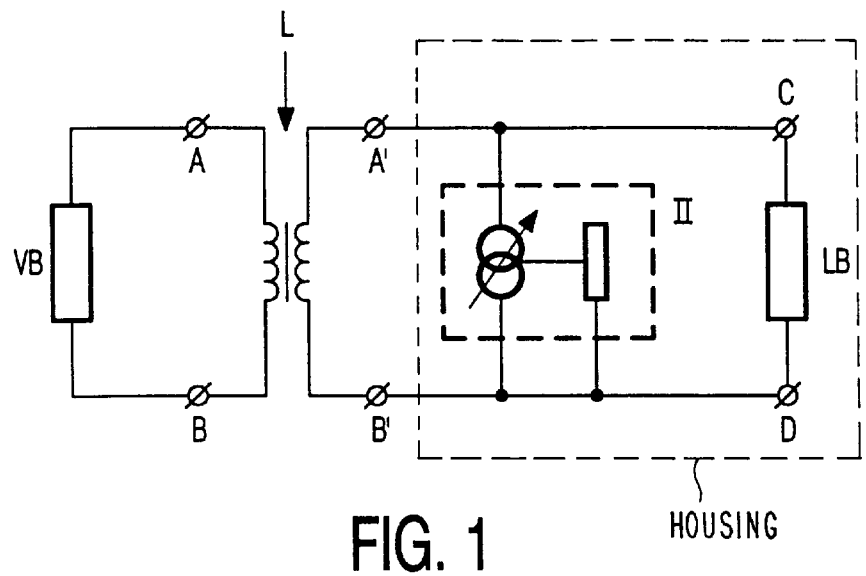

In FIG. 1, A and B are connection terminals for connecting a power supply unit VB, for example provided with a solid state relay. A and B are interconnected by a primary winding of a transformer L whose secondary winding is connected to terminals A' and B'. C and D are output terminals for connecting the semiconductor light source LB. II denotes a self-controlling controlled constant current generator.

Figure 2:
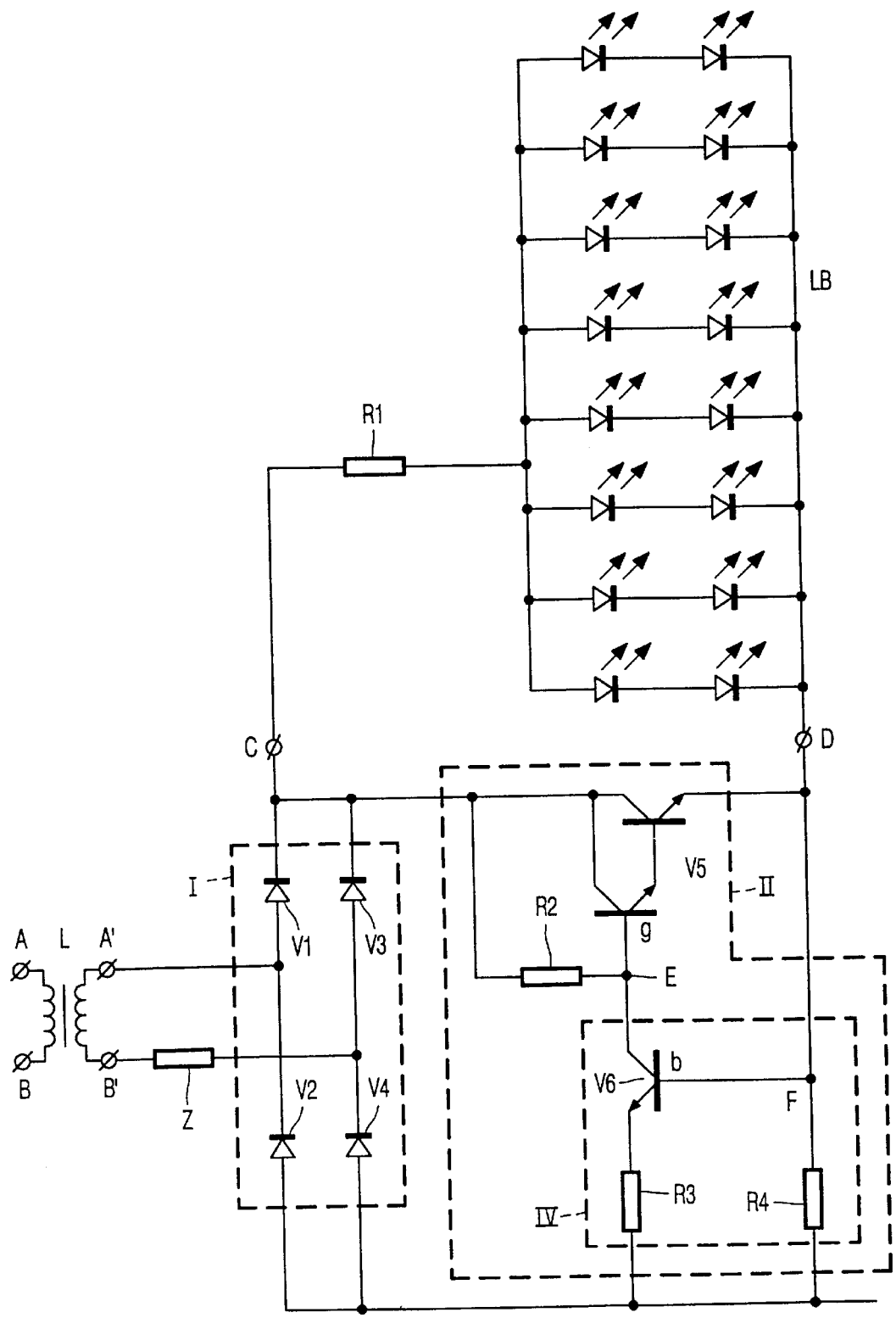
FIG. 2 is a more detailed diagram of a self-regulating current network.

The controlled constant current generator II, whose diagram is shown in more detail in FIG. 2, comprises a semiconductor switch V5 provided with a gate g and is connected between the connection terminals C and D. The gate g of the semiconductor switch V5 is connected to the output terminal C via a resistor R2.

In FIG. 2, furthermore, IV denotes means present in the circuit arrangement for controlling the controlled constant current generator II when the power supply VB is connected. A switch V6 is for this purpose connected at one side to a common junction point E of resistor R2 and gate g of the semiconductor switch V5 and at the other side via a resistor R3 to one of the terminals A' and B'. A control electrode b of switch V6 is connected to output terminal D and to one of the terminals A' and B' via a resistor R4 which acts as a current sensor. The embodiment of the circuit arrangement shown in FIG. 2 is suitable for connection to a power supply which delivers an AC voltage. To this end, a rectifier circuit I comprising rectifiers V1, V2, V3, V4 is connected to the terminals A' and B'. A current fuse Z is also incorporated in the rectifier circuit I. The semiconductor light source LB in FIG. 2 is provided with a current-limiting impedance R1 in series with a matrix of LEDs.

In a practical realization of the embodiment of the circuit arrangement according to the invention as described above, it is suitable for connection to a power supply unit having a voltage of 230 V, 50 Hz in the conducting state and suitable for operating a semiconductor light source comprising a matrix of 8×2 LEDs, make Hewlett-Packard, with a forward voltage $V_F$ of between 2 V and 3 V, defined for 250 mA and an ambient temperature of 25° C. The semiconductor light source also comprises an impedance R1 of 2 ohms in series with the matrix of LEDs, acting as a current limiter. The transformer L, having a winding ratio of 22:1, transforms the voltage of the power supply down to 10.5 V present at the terminals A' and B'. The semiconductor switch V5 of the controlled constant current generator II is a Darlington pair of the BDT65 type (make Philips). The resistors R2, R3, and R4 have respective values of 1 k$\Omega$, 10$\Omega$, and 0.47$\Omega$. The switch V6 is of the BC547 type (make Philips). The current fuse Z is a 6.3 A glass fuse. The rectifiers V1, V2, V3, V4 are of the BYM56/200 type (make Philips).

Figure 3:
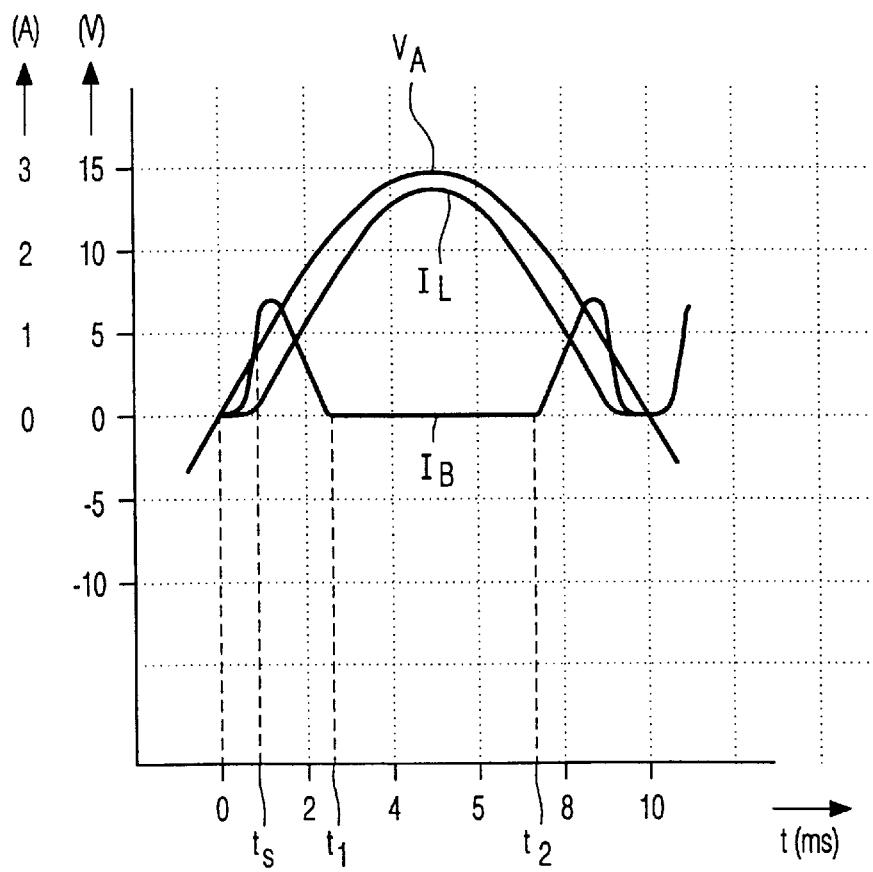
FIG. 3 is a voltage-current graph relating to the circuit arrangement shown in FIG. 1.

The operation of the circuit arrangement will be explained in more detail with reference to FIG. 3. In FIG. 3, time in ms is plotted on the horizontal axis and voltage in V and current in A on the vertical axis. When the power supply is connected, the voltage $V_A$ at the terminals A', B', and thus across the semiconductor light source, will initially be so low, after a zero passage of the voltage of the power supply, that the voltage across each of the LEDs lies below the forward voltage thereof, so that a minimum current will flow as the current $I_L$ through the light source. At the same time, the semiconductor switch V5 will be driven into conduction via the resistor R2, so that a current $I_B$ will flow through the resistor R4 which is limited by the impedances of the rectifier circuit, the semiconductor switch, and the resistor R4. It is realized through a suitable choice of these components that the current drawn from the power supply, and accordingly flowing through the terminals A' and B', will comply with the standard for correct functioning of the signalling light at the moment $t_s$ of the status test. As the voltage of the power supply rises further, it will rise to above the forward voltage of the LEDs, and the LEDs will become highly conductive, which causes the current $I_L$ to rise appreciably. This current then also flows through the resistor R4. The resistor R4, which acts as a current sensor, thereby generates a control signal which is dependent both on the value of the current through the light source LB and on the value of the current supplied by the controlled constant current generator. This rise in $I_L$ will cause the voltage across R4 to rise, so that the switch V6 becomes conducting, and the semiconductor switch V5 is short-circuited thereby. A control signal for controlling the controlled constant current generator is thus generated through the resistor R4, and the controlled constant current generator is switched off in a self-controlled manner at moment $t_1$ up to a moment $t_2$ when the voltage across R4 drops, owing to the decrease of the current through the LED array, to such an extent that the switch V6 becomes non-conducting and the controlled constant current generator is switched on again in a self-controlled manner. Any short-circuit in, for example, the current sensor R4 will not lead to a limitation of the current $I_B$ supplied by the power supply unit, but to an additional strong rise thereof. The continuation of such a hazardous condition is prevented by the presence of the current fuse Z. Although any short-circuit in the light source LB will lead to a strong rise in the voltage across R4, and thus to switching-off of the controlled constant current generator, the presence of the current fuse Z again prevents the continuation of such a hazardous condition also in this situation. The embodiment described is suitable for use in an existing traffic control installation of the European model, where a status test is carried out every 1.2 ms after the zero passage of the voltage of the power supply. A correct functioning of the relevant signalling light requires that at the test moment $t_s$ the current drawn from the power supply is at least 48 mA, which corresponds to a current value of at least 1.05 A through the terminals A' and B'. This value is 1.08 A in the embodiment described.

The circuit arrangement fitted with a housing forms part of a signalling light which is provided with a housing accommodating the semiconductor light source, which housing is integral with the housing of the signalling light. The embodiment described is highly suitable for use as a traffic light in a traffic control system. The use of a switch mode power supply instead of the impedance R1 is highly suitable for achieving a further reduction in the power consumed by the signalling light.

What is claimed is:

1. A circuit arrangement for operating a semiconductor light source, comprising:
   connection terminals for connection to a power supply,
   output terminals for connecting the semiconductor light source, and
   a controlled constant current generator coupled to said output terminals and controlled at least in part by current flow through the semiconductor light source.

2. A circuit arrangement as claimed in claim 1, wherein the controlled constant current generator is self-controlling.

3. A circuit arrangement as claimed in claim 1, further comprising a current sensor for generating a control signal for controlling the controlled constant current generator, said control signal being dependent both on the current through the semiconductor light source and on a current supplied by the controlled constant current generator.

4. A circuit arrangement as claimed in claim 1, further comprising a current fuse in series with the semiconductor light source and the controlled constant current generator.

5. A circuit arrangement as claimed in claim 1 wherein the connection terminals are intended for connection to an AC power supply, the controlled constant current generator and the semiconductor light source are connected in parallel to said output terminals, the semiconductor light source has a conduction threshold voltage, and the controlled constant current generator comprises a switchable transistor that is switched off when the power supply voltage exceeds said conduction threshold voltage.

6. A circuit arrangement as claimed in claim 1 wherein the semiconductor light source comprises at least two parallel connected light emitting diodes having a conduction threshold voltage, and the operation of the controlled constant current generator is determined in part by said conduction threshold voltage.

7. A signalling light comprising:

a housing accommodating a semiconductor light source in combination with the circuit arrangement as claimed in claim 1.

8. A signalling light as claimed in claim 7, wherein the circuit arrangement includes a housing which is integral with the housing of the signalling light.

9. A circuit for operating a semiconductor light source comprising:

input terminals for connection to a power supply, a pair of output terminals for connection to the semiconductor light source and coupled to the input terminals, and a controlled current generator coupled to the output terminals in parallel with the semiconductor light source and controlled in part by a current supplied by the controlled current generator.

10. The operating circuit as claimed in claim 9 wherein the input terminals are adapted for connection to a source of AC supply voltage, the circuit further comprising a transformer and a rectifier circuit coupling the input terminals to the output terminals.

11. The operating circuit as claimed in claim 9 wherein the controlled current generator comprises:

a first transistor coupled to said output terminals in parallel with the semiconductor light source, a second transistor coupled to a control electrode of the first transistor and to a first one of said output terminals and controlled in part by a current flowing through the semiconductor light source, and means coupling the control electrode of the second transistor to a second one of said output terminals.

12. The operating circuit as claimed in claim 11 further comprising a resistor for generating a control signal for the control electrode of the second transistor and connected in circuit in series with both the first transistor and the semiconductor light source.

13. The operating circuit as claimed in claim 9 further comprising a resistor for generating a control signal for controlling the controlled current generator and connected in the circuit such that the control signal is dependent both on the current through the semiconductor light source and on a current supplied by the controlled current generator.

14. The operating circuit as claimed in claim 9 wherein the input terminals are adapted for connection to a source of AC supply voltage, the circuit further comprising a transformer and a rectifier circuit coupling the input terminals to the output terminals and with a fuse connected between a secondary winding of the transformer and one input terminal of the rectifier circuit.

15. The operating circuit as claimed in claim 9 wherein the power supply provides a voltage that periodically passes through a zero voltage, and the semiconductor light source comprises at least one light emitting diode having a forward conduction threshold voltage, and the controlled current generator comprises a switchable current source that is turned off when the power supply voltage exceeds said forward conduction threshold voltage of the at least one light emitting diode.

16. The operating circuit as claimed in claim 9 wherein the power supply provides a voltage that periodically passes through a zero voltage, and the semiconductor light source comprises at least one light emitting diode having a forward conduction threshold voltage, and the controlled current generator comprises a switchable current source that is on when the power supply voltage is below said forward threshold voltage and is turned off when the power supply voltage exceeds said forward conduction threshold voltage of the at least one light emitting diode.

\* \* \* \* \*